United States Patent
Chang

(10) Patent No.: US 7,724,308 B2
(45) Date of Patent: May 25, 2010

(54) CROSS COLOR SUPPRESSING APPARATUS AND METHOD THEREOF

(75) Inventor: Fung-Jane Chang, Hsinhua (TW)

(73) Assignee: Himax Technologies Limited, Tainan County (TW)

( * ) Notice: Subject to any disclaimer, the term of this patent is extended or adjusted under 35 U.S.C. 154(b) by 1025 days.

(21) Appl. No.: 11/329,098

(22) Filed: Jan. 11, 2006

(65) Prior Publication Data
US 2006/0152631 A1   Jul. 13, 2006

(30) Foreign Application Priority Data
Jan. 12, 2005   (TW) ............................... 94100931 A

(51) Int. Cl.
H04N 5/00   (2006.01)
(52) U.S. Cl. .................. 348/624; 348/607; 348/609; 348/666; 348/644; 348/645
(58) Field of Classification Search ............... 348/607, 348/609, 624, 666, E29.042
See application file for complete search history.

(56) References Cited

U.S. PATENT DOCUMENTS

| | | | |
|---|---|---|---|
| 4,847,683 A | 7/1989 | Lang | |
| 5,305,120 A | 4/1994 | Faroudja | |
| 5,355,176 A * | 10/1994 | Inagaki et al. ............... | 348/609 |
| 6,055,024 A * | 4/2000 | DiMeo et al. ............... | 348/668 |
| 6,608,942 B1 * | 8/2003 | Le ............................... | 382/279 |
| 7,012,651 B2 * | 3/2006 | Kondo et al. ............... | 348/624 |
| 7,333,678 B1 * | 2/2008 | Huang et al. ............... | 382/300 |
| 7,349,026 B2 * | 3/2008 | Wyman et al. ............... | 348/441 |
| 7,349,028 B2 * | 3/2008 | Neuman et al. ............. | 348/448 |
| 7,376,288 B2 * | 5/2008 | Huang et al. ............... | 382/300 |
| 7,397,515 B2 * | 7/2008 | Walls et al. .................. | 348/624 |
| 7,454,078 B2 * | 11/2008 | Ramamurthy ............... | 382/254 |
| 7,519,232 B2 * | 4/2009 | Neuman et al. ............. | 382/266 |
| 7,532,254 B1 * | 5/2009 | Woodall ...................... | 348/609 |
| 7,535,515 B2 * | 5/2009 | Bacche et al. ............... | 348/666 |
| 7,551,232 B2 * | 6/2009 | Winger et al. ............... | 348/607 |
| 2003/0071921 A1 * | 4/2003 | Tanigawa ..................... | 348/664 |
| 2004/0179141 A1 | 9/2004 | Topper | |
| 2005/0134740 A1 * | 6/2005 | Bacche ........................ | 348/638 |
| 2005/0134745 A1 * | 6/2005 | Bacche et al. ............... | 348/702 |
| 2005/0168650 A1 * | 8/2005 | Walls et al. .................. | 348/666 |

(Continued)

FOREIGN PATENT DOCUMENTS

EP   618738 B1   10/1994

(Continued)

Primary Examiner—Brian P Yenke
(74) Attorney, Agent, or Firm—Rabin & Berdo, P.C.

(57) ABSTRACT

A cross color suppressing apparatus used for suppressing the cross color of a frame is provided. The frame has several pixels, and the image data of each pixel include a luminance and a chrominance. The apparatus includes a diagonal edge detector, a cross color detector and a chrominance suppressing unit. The diagonal edge detector is used for determining whether target pixel is on a diagonal edge according to the luminance of the target pixel and that of its neighboring pixels. The cross color detector is used for determining whether the chrominance of the target pixel is substantially different from that of its neighboring pixels. If both the determination results of the diagonal edge detector and the cross color detector are true, the chrominance suppressing unit suppresses the chrominance of the target pixel and its neighboring pixels.

14 Claims, 3 Drawing Sheets

U.S. PATENT DOCUMENTS

| | | | |
|---|---|---|---|
| 2005/0168657 A1* | 8/2005 | Neuman et al. | 348/700 |
| 2005/0280740 A1* | 12/2005 | Chao | 348/624 |
| 2006/0017854 A1* | 1/2006 | Chao | 348/624 |
| 2007/0211957 A1* | 9/2007 | Ou et al. | 382/266 |
| 2007/0258013 A1* | 11/2007 | Chao | 348/624 |
| 2008/0075394 A1* | 3/2008 | Huang et al. | 382/300 |
| 2008/0151122 A1* | 6/2008 | Lin et al. | 348/700 |

FOREIGN PATENT DOCUMENTS

| | | |
|---|---|---|
| TW | 0140265 | 8/1990 |

* cited by examiner

|  a  |  b  |  c  |
| --- | --- | --- |
|  d  |  e  |  f  |
|  g  |  h  |  i  |

# CROSS COLOR SUPPRESSING APPARATUS AND METHOD THEREOF

This application claims the benefit of Taiwan application Serial No. 94100931, filed Jan. 12, 2005, the subject matter of which is incorporated herein by reference.

BACKGROUND OF THE INVENTION

1. Field of the Invention

The invention relates in general to a color processing apparatus, and more particularly to a color processing apparatus for reducing cross color.

2. Description of the Related Art

Ordinary screens, such as CRT TV monitors or liquid crystal TV monitors for instance, adopt composite video or S video as the format of the source video. Composite video, labeled as Vcomp, is a quadrature modulated signal and includes two formats, namely NTSC and PAL:

$$Vcomp\_PAL = Y + U \sin \omega t° \pm V \cos \omega t + \text{timing}$$

$$Vcomp\_NTSC = Y + Q \sin (\omega t + 33°) \pm I \cos (\omega t + 33°) + \text{timing}$$

wherein, Y is the luminance, U and V (or I and Q) are chrominance C. For the convenience of explanation, the chrominance C here below includes U and V.

FIG. 1 is a block diagram of an ordinary display apparatus. The composite video Vcomp, having been received by display apparatus 100, is separated into the image data of luminance Y and that of chrominance C by a decoder 110 according to the above formula, and then displayed by a display module 120.

FIG. 2 is a diagram showing the amplitude-frequency relationship for luminance Y and chrominance C. NTSC composite video adopts a bandwidth of about 6 MHz, the carrier wave of the chrominance C has a higher frequency of 3.58 MHz, while the carrier wave of luminance Y has a lower frequency. Therefore, the ordinary decoder 100 can separate Y from C.

However, the luminance Y of the pixel on a diagonal edge still contains a component of high frequency, and can be mixed with high-frequency chrominance C. Consequently, the signal of chrominance C may be mixed with the signal of luminance Y, causing cross color and generating rainbow colors.

SUMMARY OF THE INVENTION

It is therefore the object of the invention to provide a cross color suppressing apparatus to reduce the cross color and increase image quality.

According to an object of the invention, a cross color suppressing apparatus used for suppressing the cross color of a frame is provided. The frame has several pixels, and the image data of each pixel include a luminance and a chrominance. The apparatus includes a diagonal edge detector, a cross color detector and a chrominance suppressing unit. The diagonal edge detector is used for determining whether target pixel is on a diagonal edge according to the luminance of the target pixel and that of its neighboring pixels. The cross color detector is used for determining whether the chrominance of the target pixel is substantially different from that of its neighboring pixels. If both the results of the diagonal edge detector and that of the cross color detector are true, then the chrominance suppressing unit suppresses the chrominance of the target pixel and that of its neighboring pixels.

According to another object of the invention, a cross color suppressing apparatus including a diagonal edge detecting unit and a chrominance suppressing unit is provided. The diagonal edge detecting unit is used for determine whether the target pixel is on a diagonal edge according to the luminance of a target pixel and that of its neighboring pixels. The chrominance suppressing unit is used for suppressing the chrominance of the target pixel according to the results of the diagonal edge detector.

According to yet another object of the invention, a cross color suppressing apparatus including a cross color detecting unit and a chrominance suppressing unit is provided. The cross color detecting unit is used for determining whether the chrominance of a target pixel is substantially different from that of its neighboring pixels. The chrominance suppressing unit is used for suppressing the chrominance of the target pixel according to the results of the diagonal edge detector.

According to still another object of the invention, a cross color suppressing method is provided. At first, whether the target pixel is on a diagonal edge is determined according to the luminance of the target pixel and that of its neighboring pixels, and whether the chrominance of the target pixel is substantially different from that of its neighboring pixels is also determined. Then, the chrominance of the target pixel and that of its neighboring pixels are suppressed if the target pixel is positioned on a diagonal edge and the chrominance of the target pixel is substantially different from that of its neighboring pixels.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 4A is a diagram showing a target pixel and its neighboring pixels according to a preferred embodiment of the invention;

FIG. 4B is a diagram of a vertical filter VF according to a preferred embodiment of the invention;

FIG. 4C is a diagram of a horizontal filter according to a preferred embodiment of the invention; and FIG. 5 is a diagram showing the chrominance difference according to a preferred embodiment of the invention.

DETAILED DESCRIPTION OF THE INVENTION

Figure 1:
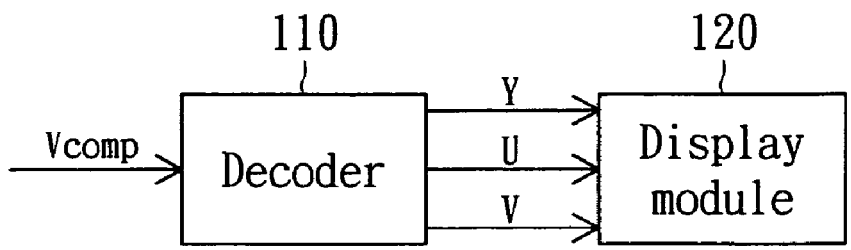
FIG. 1 is a block diagram of an ordinary display apparatus.
Figure 2:
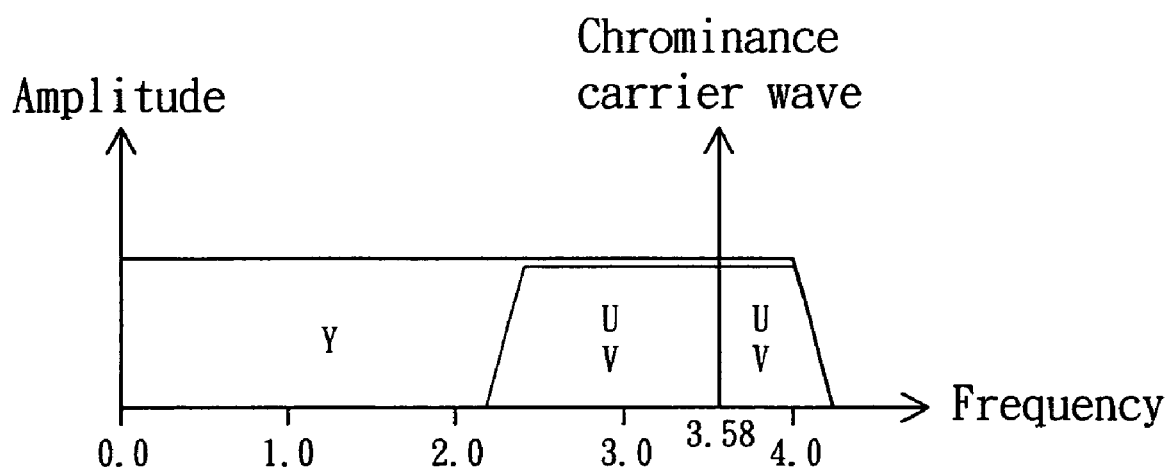
FIG. 2 is a diagram showing the amplitude-frequency relationship for luminance Y and chrominance C.
Figure 3:
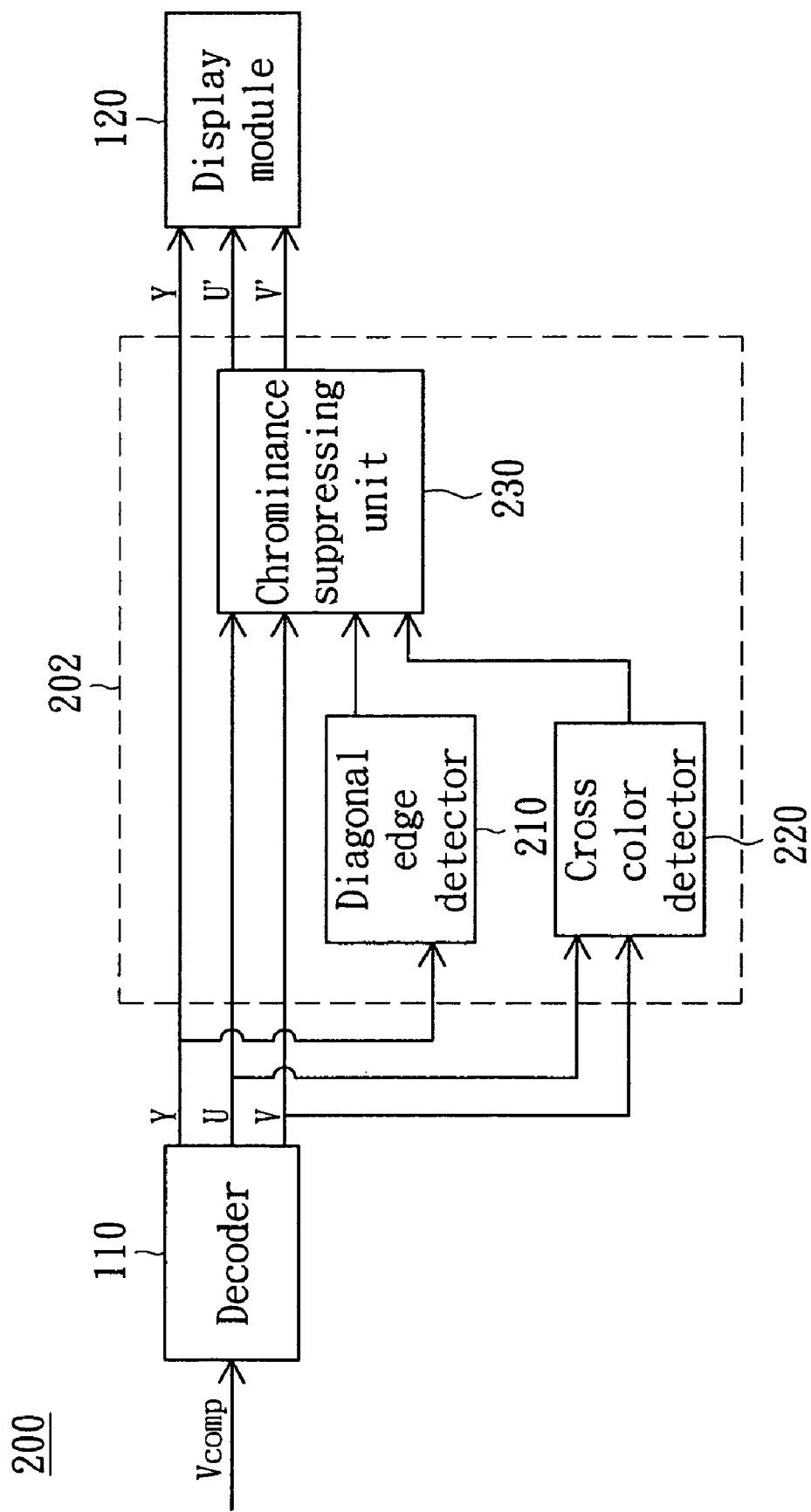
FIG. 3 is a block diagram of a display apparatus according to a preferred embodiment of the invention.

Referring to FIG. 3, a block diagram of a display apparatus according to a preferred embodiment of the invention is shown. Display apparatus 200 includes a decoder 110, a display module 120 and a cross color suppressing apparatus 202. The decoder 110 separates luminance Y and chrominance C from the composite video Vcomp. Chrominance C is exemplified by U and V here. The cross color suppressing apparatus 202 receives the luminance Y and the chrominance U and V, suppresses their cross color and then outputs the luminance Y and chrominance U' and V' to be displayed on the display module 120.

The cross color suppressing apparatus 202 includes a diagonal edge detector 210, a cross color detector 220 and a chrominance suppressing unit 230. Since the cross color is generated when luminance Y has a high frequency, that is, when a diagonal edge exists, first of all, the diagonal edge detector 210 is used to detect whether a target pixel is on the diagonal edge. Next, the cross color detector 220 is used for determining whether the chrominance of the target pixel is substantially different from that of the neighboring pixels above and under the target pixel. Then, the chrominance suppressing unit 230 outputs the luminance Y and the chrominance U' and V' according to both the determination results of the diagonal edge detector 210 and the cross color detector 220. The decoder 110 can be a two-dimensional (2D) decoder for instance.

Referring to FIG. 4A, a diagram of a target pixel and its neighboring pixels according to a preferred embodiment of the invention is shown. In the diagram, the grey value of the target pixel is labeled as e, and the grey value of the surrounding 8 pixels of the target pixel are labeled as a, b, c, d, f, g, h and i. The diagonal edge detector 210, first of all, calculates the vertical image gradient V_coeff and horizontal image gradient H_coeff of the luminance Y of the target pixel and that of its neighboring pixels.

FIG. 4B is a diagram of a vertical filter VF according to a preferred embodiment of the invention. The vertical filter VF is for performing a weighting operation on the pixel grey values of FIG. 4A, and the vertical image gradient is obtained as follows:

$$V\_coeff=abs(a-c)+abs(2*d-2*f)+abs(g-i)$$

FIG. 4C is a diagram of horizontal filters HF1 and HF2. Horizontal filters HF1 and HF2 are used to perform a weighting operation on the grey value of the pixel of FIG. 4A, and by adding up the results of the weighting operation, the horizontal image gradient is obtained as follows:

$$H\_coeff=abs(a-d)+abs(2*b-2*e)+abs(c-f)+abs(g-d)+abs(2*h-2*e)+abs(i-f)$$

Next, the diagonal edge detector 210 determines whether the vertical image gradient V_coeff and the horizontal image gradient H_coeff are respectively larger than a vertical threshold value Vth and a horizontal threshold value Hth. If yes, the target pixel is positioned on a diagonal edge. The pixel grey values of FIG. 4A range from 0 to 255. Vth ranges from 80 to 128, and Hth ranges from 96 to 140.

The cross color detector 220 is used for determining whether the chrominance of the target pixel is substantially different from that of the neighboring pixels above and under the target pixel. At first, a map_U matrix is generated by performing a threshold operation on the U value of each pixel of FIG. 4A, and a map_V matrix is generated by performing a threshold operation on the V value of each pixel. The value of U and the value of V respectively range from 0 to 255.

If the U value of a pixel is larger than or equal to 128, then the corresponding position of the map_U is recorded as 1. If the U value of a pixel is smaller than or equal to 128, then the corresponding position of the map_U is recorded as −1. Similarly, if the V value of a pixel is larger than or equal to 128, then the corresponding position of the map_V is recorded as 1. If the V value of a pixel is smaller than or equal to 128, then the corresponding position of the map_V is recorded as −1. That is:

$$map\_U(x,y)=(U(x,y)>=128)?(1:(U(x,y)<128?-1:0))$$

$$map\_V(x,y)=(V(x,y)>=128)?(1:(V(x,y)<128?-1:0))$$

If any map_U or map_V complies with the chrominance difference diagram CF1 or CF2 of FIG. 5, it is implied that the chrominance of the target pixel is substantially different from that of the neighboring pixels above and under the target pixel and the results are outputted to the chrominance suppressing unit 230.

When both the determination results of the diagonal edge detector 210 and the cross color detector 220 are true, the chrominance suppressing unit 230 suppresses the chrominance of the target pixel and its vertical neighboring pixels. Let the value of U or V be expressed by 8 bits. As the U or V value gets closer to the middle value 128, the chrominance of the pixel becomes weaker. Especially when both the U value and the V value are equal to 128, the grey value is entirely determined by the Y value. Therefore, the chrominance suppressing unit 230 converges the chrominance value to the middle value 128 according to a suppression parameter Rc. The suppression parameter Rc is exemplified as:

$$Rc=[1\ 1\ 2\ 4\ 5\ 6\ 10\ 16\ (16)\ 16\ 10\ 6\ 5\ 4\ 2\ 1\ 1]$$

That is, the chrominance of the target pixel (x,y) and that of its horizontal neighboring pixels are added/subtracted by the corresponding suppression parameter Rc in order to suppress the chrominance value to 128. That is, U(x−8, y)~U(x+8,y) respectively correspond to Rc[1]~Rc[17], and V(x−8, y)~V(x+8,y) respectively correspond to Rc[1]~Rc[17]. When U(x, y) is larger than 128, then U'(x,y)=U(x,y)−Rc[9]. If the operated U'(x,y)<128, then U'(x,y)=128, so the chrominance approaches 128 and will not be reduced to be smaller than 128. When U(x,y) is smaller than 128, then U'(x,y)=U(x,y)+Rc[9]. If the operated U'(x,y)>128, then U'(x,y)=128, so the chrominance value approaches 128 and will not be added to be larger than 128. For example, if the original U(x,y)=150, which is larger than 128, then 150 is subtracted by Rc[9] (that is, 16) and the obtained difference equals to 134. That is, the chrominance suppressed U'(x,y)=134. If the original U(x, y)=140, which is larger than 128, then 140 is subtracted by 16 and the obtained difference equals to 124, which is smaller than 128, and the chrominance suppressed U'(x,y)=128. If the original U(x+2,y)=150, then the chrominance suppressed U'(x+2,y)=150−10=140. If the original U(x−2,y)=130, then 130 is subtracted by 10, the obtained difference equals to 120, which is smaller than 128, and the chrominance suppressed U'(x−2,y)=128. Similarly, the V values of the pixels are operated like the U values of the pixels. For example, V(x−4, y)=100, and 100 is added by 5 and amounts to 105, then the chrominance suppressed V'(x−4,y)=105. Pixel images are then displayed on the display module 120 according to the generated U' and V'.

The cross color suppressing apparatus and the method thereof disclosed in above embodiment of the invention is capable of reducing cross color and increasing image quality.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A cross color suppressing apparatus, used for suppressing cross color of a frame, the frame comprising a plurality of pixels, image data of each pixel comprising a luminance and a chrominance, the apparatus comprising:

a diagonal edge detector, for determining whether a target pixel is on a diagonal edge according to the luminance of the target pixel and the neighboring pixels of the target pixel, wherein the target pixel is one of the pixels;

a cross color detector, for determining whether the chrominance of the target pixel is substantially different from the chrominance of the neighboring pixels of the target pixel, wherein the cross color detector respectively compares the chrominance of the target pixel and the neighboring pixels of the target pixel with a standard value and classifies them as a first category and a second category different from the first category, and the cross color detector determines that the chrominance of the target pixel is substantially different from the chrominance of the neighboring pixels above and under the target pixel if the target pixel and the neighboring pixels at the same row with the target pixel belong to the first category and the neighboring pixels above and under the target pixel belong to the second category; and a chrominance suppressing unit, for suppressing the chrominance of the target pixel and the neighboring pixels of the target pixel if both the determination results of the diagonal edge detector and the cross color detector are true.

2. The apparatus according to 1, wherein the diagonal edge detector calculates a vertical image gradient and a horizontal image gradient of the target pixel according to the luminance of the target pixel and the neighboring pixels of the target pixel and respectively compares the calculated image gradients with a vertical threshold value and a horizontal threshold value, and the diagonal edge detector determines the target pixel to be positioned on the diagonal edge if the vertical image gradient is larger than the vertical threshold value and the horizontal image gradient is larger than the horizontal threshold value.

3. The apparatus according to 2, wherein the diagonal edge detector performs a weighting operation on the luminance of the target pixel and the neighboring pixels of the target pixel by a vertical filter and obtains the vertical image gradient accordingly.

4. The apparatus according to 2, wherein the diagonal edge detector performs a weighting operation on the luminance of the target pixel and the neighboring pixels of the target pixel by a horizontal filter and obtains the horizontal image gradient.

5. The apparatus according to 1, wherein the chrominance suppressing unit reduces the chrominance of the adjacent pixels at the same row with the target pixel.

6. The apparatus according to claim 1, wherein the chrominance suppressing unit reduces the chrominance of the adjacent pixels at the same row with the target pixel, and the closer to the target pixel the pixel is, the larger the chrominance of the pixel is reduced.

7. A cross chrominance suppressing method, used for suppressing the cross color of a frame, the frame comprising a plurality of pixels, image data of each pixel comprising a luminance and a chrominance, the method comprising:
 determining whether a target pixel is on a diagonal edge according to the luminance of the target pixel and the neighboring pixels of the target pixel, wherein the target pixel is one of the pixels;
 respectively comparing the chrominance of the target pixel and the neighboring pixels of the target pixel with a standard value and classifying them as a first category and a second category;
 determining that the chrominance of the target pixel is substantially different from that of the neighboring pixels above and under the target pixel if the target pixel and the neighboring pixels at the same row with the target pixel belong to the first category and both the neighboring pixels above and under the target pixel belong to the second category; and
 suppressing the chrominance of the target pixel and that of the neighboring pixels of the target pixel if the target pixel is positioned on the diagonal edge and the chrominance of the target pixel is substantially different from that of the neighboring pixels of the target pixel.

8. The method according to 7, wherein the step of detecting the diagonal edge comprises:
 calculating a vertical image gradient and a horizontal image gradient of the target pixel according to the luminance of the target pixel and the neighboring pixels of the target pixel;
 comparing the vertical image gradient with a vertical threshold value and comparing the horizontal image gradient with a horizontal threshold value; and
 determining that the target pixel is positioned on the diagonal edge if the vertical image gradient is larger than the vertical threshold value and the horizontal image gradient is larger than the horizontal threshold value.

9. The method according to 8, wherein the step of calculating the vertical image gradient further performs a weighting operation on the luminance of the target pixel and the neighboring pixels of the target pixel by a vertical filter and obtains the vertical image gradient accordingly.

10. The method according to 8, wherein the step of calculating the horizontal image gradient further performs a weighting operation on the luminance of the target pixel and the neighboring pixels of the target pixel by a horizontal filter and obtains the horizontal image gradient accordingly.

11. The method according to 7, wherein the chrominance suppressing step reduces the chrominance of the adjacent pixels at the same row with the target pixel.

12. The method according to 7, wherein the chrominance suppressing unit reduces the chrominance of the adjacent pixels at the same row with the target pixel, and the closer to the target pixel the pixel is, the larger the chrominance of the pixel is reduced.

13. A cross color suppressing apparatus, comprising:
 a cross color detecting unit, for determining whether the chrominance of a target pixel differs with that of the neighboring pixels of the target pixel, wherein the cross color detector respectively compares the chrominance of the target pixel and the neighboring pixels of the target pixel with a standard value and classifies them as a first category and a second category different from the first category, and the cross color detector determines that the chrominance of the target pixel is substantially different from the chrominance of the neighboring pixels above and under the target pixel if the target pixel and the neighboring pixels at the same row with the target pixel belong to the first category and the neighboring pixels above and under the target pixel belong to the second category; and a chrominance suppressing unit, for suppressing the chrominance of the target pixel according to the determination result of the cross color detecting unit.

14. The apparatus according to 13, further comprising:
a diagonal edge detecting unit, for determining whether the target pixel is on a diagonal edge according to the luminance of the target pixel and that of the neighboring pixels of the target pixel;
wherein the chrominance suppressing unit further suppresses the chrominance of the target pixel according to the determination result of the diagonal edge detecting unit; and
wherein the luminance and chrominance of the target pixel come from a decoding unit.

* * * * *